United States Patent [19]
Hagen et al.

[11] 3,844,027
[45] Oct. 29, 1974

[54] COPPER BRAZING OF MATRIX STRUCTURES

[75] Inventors: Frederick A. Hagen, Birmingham; Royal E. Davis, Farmington, both of Mich.

[73] Assignee: Chrysler Corporation, Highland Park, Mich.

[22] Filed: June 25, 1973

[21] Appl. No.: 373,075

[52] U.S. Cl. .................. 29/488, 29/502, 117/99
[51] Int. Cl. ............................... B21d 53/02
[58] Field of Search ........ 117/99; 29/488, 498, 502, 29/487

[56] References Cited
UNITED STATES PATENTS
2,962,811  12/1960  Herbert ........................... 29/498

*Primary Examiner*—Gerald A. Dost
*Attorney, Agent, or Firm*—Talburtt & Baldwin

[57] ABSTRACT

A method of applying copper brazing material to matrix structures, such as turbine engine regenerator cores, for copper brazing them.

14 Claims, 5 Drawing Figures

PATENTED OCT 29 1974
3,844,027
SHEET 1 OF 2
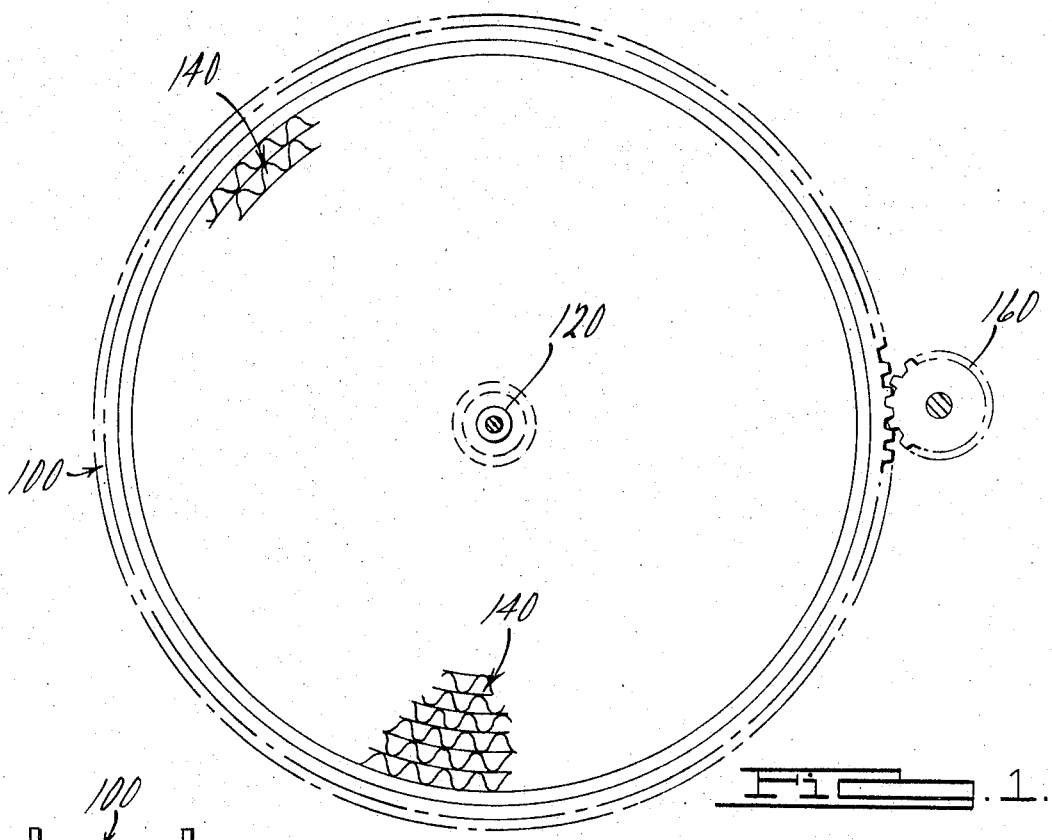
FIG. 1.
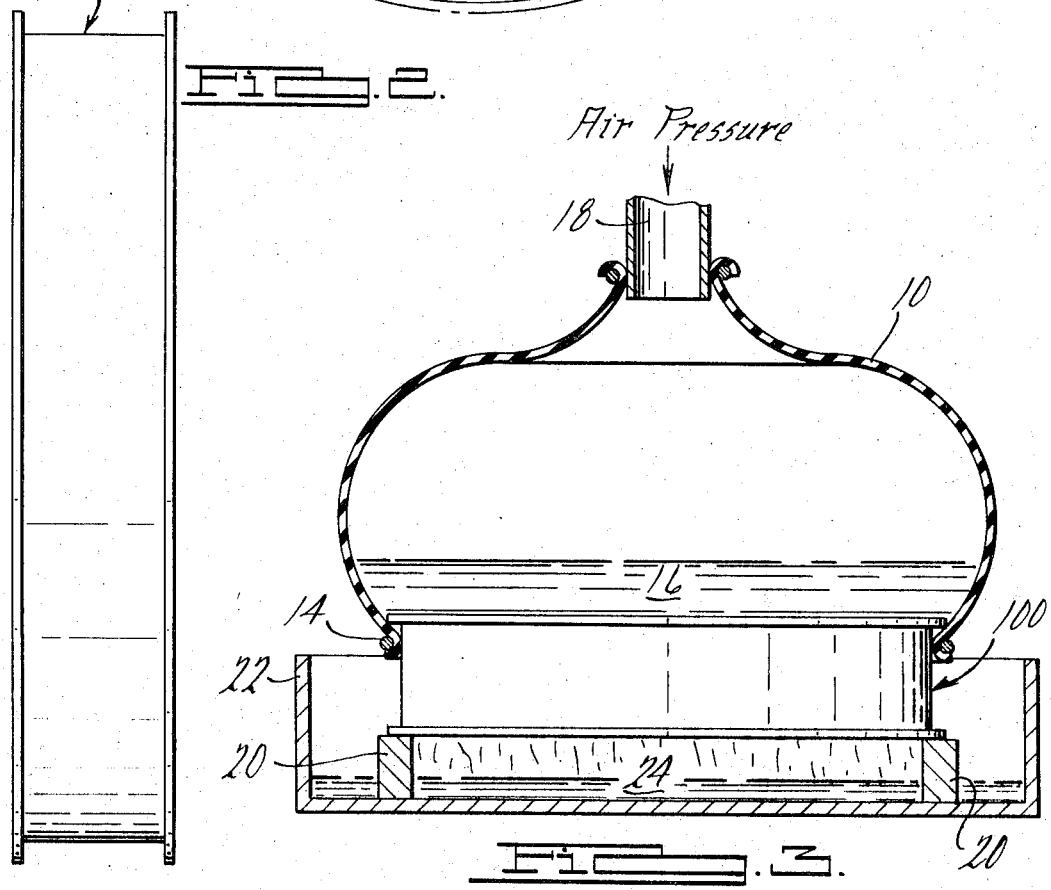
FIG. 2.
FIG. 3.

COPPER BRAZING OF MATRIX STRUCTURES

CROSS-REFERENCES TO RELATED APPLICATIONS

This application is related to two co-pending applications: Ser. No. 316,145 and now U.S. Pat. No. 3,797,087, Oxidation Resistant Brazing, and Ser. No. 318,785 and now U.S. Pat. No. 3,807,030, Oxidation Resistant Materials and Structures. This application incorporates the contents of these co-pending applications by reference.

Both of the co-pending applications disclose copper brazed matrix structures. This application describes a method of applying copper brazing material to those structures for subsequently copper brazing them. The term brazing is used herein to denote a method of forming copper joints between metal parts of a matrix structure, such as a regenerator core.

BACKGROUND OF THE INVENTION

The term "matrix structure" is used herein to refer generally to structures, such as regenerator cores, comprising a plurality of small passageways usually extending between two major faces. In the case of regenerator cores these faces are sometimes referred to as the "hot face" and "cold face", respectively.

The copper brazing of the matrix structures utilized in turbine engine regenerator cores has been a problem due to the lack of a suitable technique for uniformly distributing the copper brazing material throughout the structure prior to the actual brazing thereof. As the stock used during the development of these cores became thinner, going from 0.004 inch to 0.002 inch, it became more important to obtain better distribution of copper throughout the matrix of the core. Excess copper tends to plug matrix passages and reduce the efficiency of the regenerator. Too much copper, even if not enough to plug matrix passages, causes cohesive forces which tend to pull the passage walls of the thinner stock together causing distortion of the matrix at brazing temperatures. Insufficient copper or too thinly distributed copper results in poor joining.

Many techniques have been studied in trying to find a satisfactory method for applying copper brazing materials to matrix structures, such as regenerator cores, for the purpose of brazing them. The following methods were tested with matrix structures which could be unwound and examined: spraying, painting, rolling, dipping, dipping and vibrating vacuum and pressure methods, ultrasonic and electroplating.

The spraying technique offers speed of application and multiple thin coats for control but the brazing material fails to penetrate the depth of the cores evenly. Painting is undesirable in that the thin film of brazing material between adjacent layers multiplied by the number of layers in full size cores results in loose cores. Painting on the polished metal and the corrugated stock of the cores is not even. The use of painting rollers does not show substantial improvement. Dipping is the simplest method of coating but air tends to lock in the matrix passages and promote uneven coatings which multiple dips and inversion do not cure. Vibrating, while dipping, on a mold vibrating table does not solve the air lock problem. Also, the only apparatus found that could satisfactorily vibrate a full-size core in a container of copper brazing material slurry was a Jolt-Squeeze machine used in a foundry and this proved inadequate. The vibrating approach did suggest the use of ultrasonics but the configuration of the cores dampens or absorbs the vibrations so it offers no improvement even for degreasing with trichlorethylene.

This invention, as described hereinbelow, overcomes the disadvantages mentioned above and is applicable to the formation of copper brazed joints in matrix structures. It is described herein in connection with one type of matrix structure to which it is particularly and preferably applicable; that is, to turbine engine regenerator cores of the type shown in the aforementioned copending applications. As described therein such cores typically consist of a rim, a hub and a matrix portion. The regenerator is a relatively flat, round structure with a plurality of passageways extending axially through the matrix thereof from one face to the other for the flow of gases therethrough. The passageways may be formed by alternately positioned corrugated layers of stainless steel stock and flat layers of stainless steel stock about 3½ inches wide and 0.002 inch thick. When installed in an engine, hot gases enter one side of the regenerator matrix (the hot face) and leave at the opposite side (the cold face) as the regenerator rotates between a set of seals. To form an integral core structure the matrix parts of a regenerator are assembled together. The rim and hub are attached. The assembly is then brazed.

SUMMARY OF THE INVENTION

According to this invention in its preferred form, such an assembly, preparatory to brazing, is pressure coated with a slurry of copper oxide. It is then heated in a reduced atmosphere, hydrogen being preferred, to reduce the copper oxide to metallic or elemental copper (at about 800–1000° F) and to melt the metallic copper (at about 1980° F.) forming molten copper, which flows into all the various junctions between the parts of the assembly. There is thus formed, after cooldown to room temperature, a brazed structure which is bonded with copper joints. A slurry of copper flake or copper powder may be used in place of the copper oxide. However, the copper flake is preferred since it is easier to suspend in slurry form at suitable viscosities. The joints are able to withstand operation at temperatures up to about 1200° F. In matrix structures, care should be taken to avoid plugging the passageways by excessive amounts of copper. In the case of the regenerator cores specifically described herein, which are about 15½ inches in diameter, 3½ inches thick, the use of about 1000 grams of copper per core has been found to be adequate for brazing the cores without undue plugging.

Distribution of the slurry over the assembly is helped to some extent by the tendency of molten copper to readily flow and wet the assembly at brazing temperatures of about 1980° F. to 2050° F. Copper oxide slurries with a water vehicle are preferably used. With such slurries, the assembly is simply rinsed with water if excess slurry appears to be present. Heating of a slurried assembly produces copper brazed joints.

In the case of the regenerator cores of the aforementioned copending applications, the copper brazed structure may be subjected to further treatment to modify the copper brazes produced by the subject invention for various purposes.

BRIEF DESCRIPTION OF THE DRAWINGS

FIG. 1 is a plan view of a regenerator core showing a portion of the matrix structure thereof.

FIG. 2 is an end view of FIG. 1.

FIG. 3 is a schematic showing of an arrangement for applying slurry to a face of a regenerator core.

DESCRIPTION OF THE PREFERRED EMBODIMENTS

Figure 4:
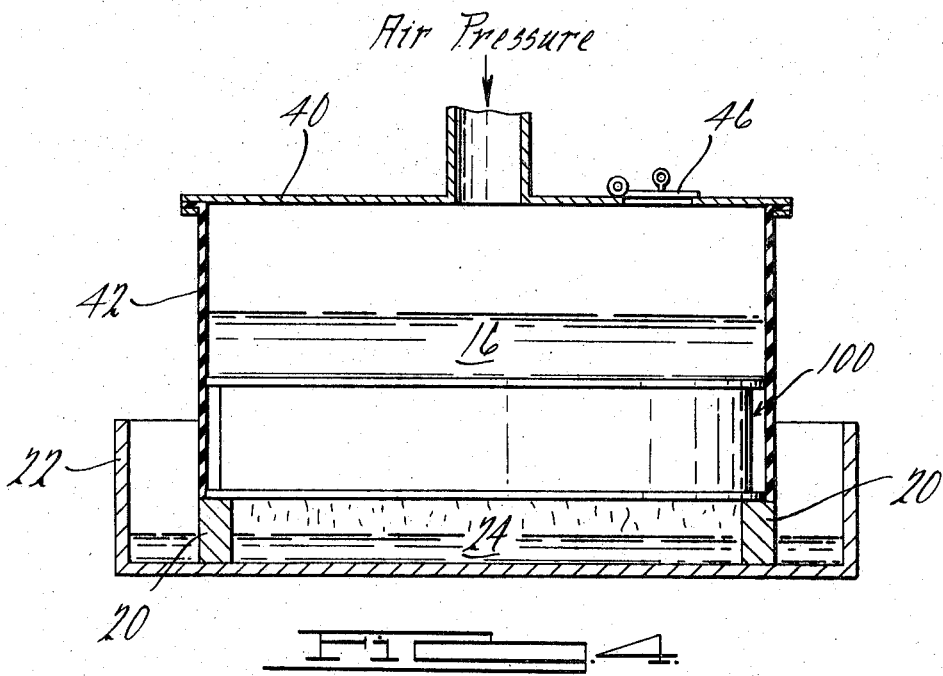
FIG. 4 is a schematic showing of another arrangement for applying slurry to a face of a regenerator core.

For the sake of discussion, FIGS. 1 and 2 show a regenerator core 100 having a hub 120 for rotation, a matrix 140 and a drive gear 160. According to this invention the use of a "head" of slurry and pressure applied thereto or a partial vacuum at the base of regenerator cores was found to provide uniform distribution of copper brazing materials. As shown in FIG. 3, plastic bag 10 with one end taped or otherwise attached, around a core 100 at its circumference at one face as shown at 14 allowed a head of slurry 16 to be poured on the core through the upper end 18 of the bag. Air pressure applied through the open upper end of bag 10 to the slurry assured even distribution over the face of the core and through the matrix. This procedure eliminated air locks and continued blowing through the matrix dried the slurry therein. The core was supported as at 20 in a suitable container 22 which received excess slurry 24 flowing through the core matrix. A sponge applied to the bottom of the core offered a method of avoiding a drip edge on the other face of the core. This method proved workable with full size cores and has been used extensively with success. The use of the plastic bag for full-size cores tends to be unwieldy thus a fixture of metal and rubber was designed which was more permanent and more easily handled. This fixture comprises an aluminum plate 40 having a depending rubber skirt 42 which fits about core 100 as shown in FIG. 4. A spencer-Turbo-compressor may be used for the air supply. This fixture functioned in the same manner as that shown in FIG. 3.

The slurry used for brazing contained cuprous oxide 97% grade, a wetting agent to disperse the cuprous oxide in water and a thickening agent to keep it suspended. Carbowax and ethylene glycol added film strength and improved adhesion of the dried paste film. Other vehicles tested were organic binders with both copper powder and flake copper but the water based binder and copper oxide was found to be more easily handled and is preferred. The slurry was calibrated for weight gain of "dry slurry retained" by correlating viscosity and density. The viscosity proved to be most easily measured and reliable in predicting a definite weight gain.

The pressure method of application (direct or by vacuum) of a slurry coat to matrix structures, such as regenerator cores, according to this invention has proven to produce uniform distribution of the brazing materials. This has been tested by metallographic examination of many brazed cores. More copper can be applied safely without repeated cycles by control of the viscosity of the slurry. The time required to slurry a core and dry it has been minimized and core brazing has thus become more practical from a production standpoint. The water based binder is easier to handle and is reusable. It also produces less carburizing agents such as CO and $CH_4$.

I. PREFERRED EMBODIMENT OF THE METHOD OF THIS INVENTION FOR COPPER BRAZING REGENERATOR CORES 15½ INCHES IN DIAMETER AND 3½ INCHES THICK OF THE TYPE SHOWN IN FIGS. 1 AND 2.

A. Core Preparation
1. Degrease the core either by pouring cold degreasing fluid, such as trichloroethylene through the matrix or preferably by the use of a vapor degreaser using trichloroethylene vapors.
2. Dry and weigh the core.
3. The main purpose of this preparation is to clean the core so the slurry when applied will wet the core uniformly for good distribution and brazing will take place without interfering contaminants.

Figure 5:
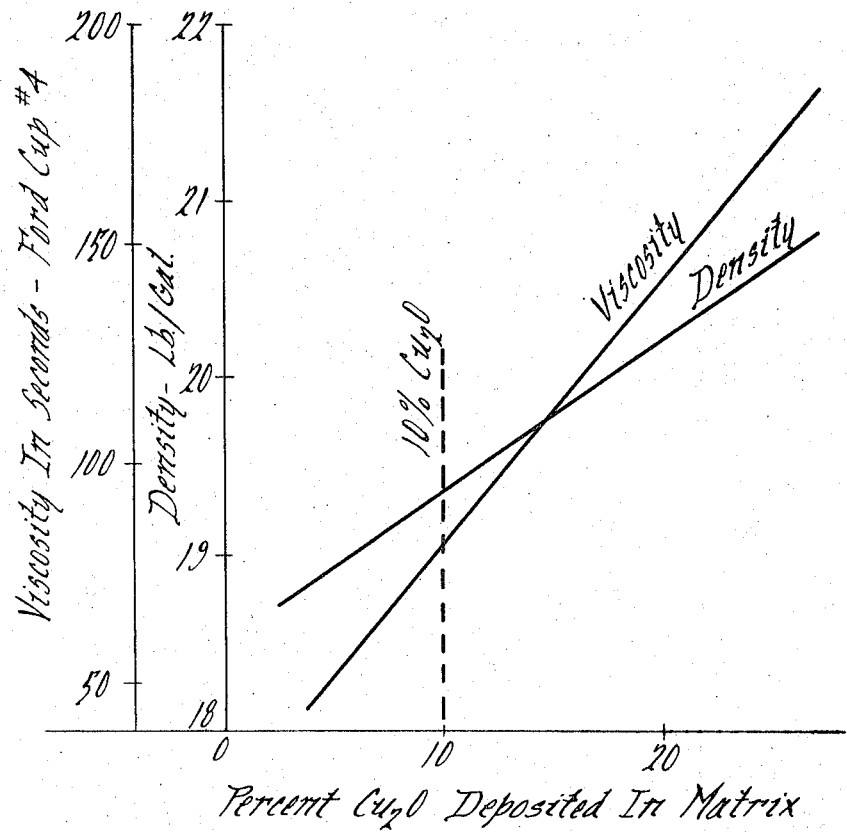
FIG. 5 is a graph showing the amount of $Cu_2O$ deposited in the matrices of typical cores at various slurry viscosities and densities by the practice of this invention.

B. Cuprous Oxide Slurry Preparation
1. Dilute Copper Brazing Paste* with water until the No. 4 Ford cup viscosity is preferably about 55 to 60 seconds. Too much copper causes plugging, distortion, splitting, etc. Too little copper results in inadequate fillets and unbonded sections that open up during running causing splits and leakage. See viscosity and density curves of FIG. 5 in this connection. Too much copper can also attach grain boundaries of matrix stock which can lead to service failures.
2. The resultant slurry is preferably strained before viscosity measurements. A 40 to 60 mesh screen preceded by a coarser screen to catch larger $Cu_2O$ flakes is suitable.
3. The viscosity range of 55–60 seconds deposits a satisfactory quantity of cuprous oxide in a regenerator core of the type and size described herein. Adjustments for other types of matrix structures may be readily made. Regenerator cores have been made that were good enough for laboratory testing by other methods of application such as brushing on flake copper in slurry but it was impossible to obtain uniform distribution from passage-to-passage and from top to bottom of each passage. Even with a very thin slurry and careful painting the ends of the passages tend to plug before any slurry reaches the center and before an adequate amount of copper is applied. Even though copper melts and flows at brazing temperatures and the distribution is improved, this alone is adequate in achieving uniform distribtuion.
4. The slurry can be stored indefinitely in glass, rubber, plastic or stainless steel containers. Ordinary steel containers corrode rapidly and contaminate the slurry.

C. Application of the Cuprous Oxide Slurry
1. The core is placed in a slurry fixture of the type shown in FIG. 4. This fixture is designed to: (1) provide a reservoir under the core for several gallons of slurry, (2) provide a closed chamber over the core which can be pressurized and, (3) support the core. The arrangement is successful in assuring uniform distribution of the slurry through the core matrix.

2. Connect a blower or other air pump means to the fixture. A blower similar to a Spencer Turbocompressor, rated at 270 cfm at 24 oz. pressure, is suitable.

3. Pour approximately 5 gallons of prepared slurry through the opening on top of fixture as at door 46 in FIG. 4 onto the upper surface of the core. This amount will of course vary depending on the particular matrix structure involved. The main concern is to provide a "head" of slurry to obtain uniform flow through the core matrix. Sample cores have been unwound after slurrying with this technique and all surfaces were uniformly coated with $Cu_2O$.

4. Turn on the blower and adjust the back-pressure to maintain about 6 inches of water. Various pressures may be used so long as the slurry is forced uniformly through the matrix structure of the core. The volume of air may be increased when slurry has been forced through the matrix, but it is preferred that about 6 inches of back-pressure not be exceeded in order to prevent disturbance of the coated surface.

5. Continue to blow air until the bottom of the core appears dry. Spray water on the bottom of the core or immerse the bottom of the core in water to unplug matrix and remove any drip edge. This step is desirable because excess copper or plugged passages result in blocking or distortion of the core.

6. Wipe off the bottom with a clean wet sponge and blow until dry.

7. Brush off any loose slurry flakes and weight the core. If the weight of the cuprous oxide retained in the matrix is less than about 8% of the matrix weight (excluding the weight of the hub), add additional slurry uniformly to the top of the core. This should be done continuously however as only a small quantity can be added without danger of plugging. If the weight of cuprous oxide retained in the matrix is more than 10% of the matrix weight (excluding the weight of the hub), wash out the bottom of the core with water by spraying or dipping. These amounts may vary with other types of matrix structures. Copper will return to the washed-out fillets during brazing by capillary action.

D. Copper Brazing of the Core

1. Place the core in a heating chamber, supported so it will not sag. Heat slowly and uniformly (about 3 hours to reach temperature is preferred) in a $H_2$ atmosphere to about 2050° F., holding at that temperature, for about ½ hour. Furnace cool to about 1400° F. with $H_2$ Atmosphere. Faster cooling is acceptable below 1400° F but the protective atmosphere should be maintained until the temperature is down to about 600° F. The lower limit of brazing temperature is determined by the melting point of copper. The upper limit is determined by the molten copper attack on the stock. If there are areas of excess copper resulting from poor distribution, the copper will attack the 0.002" stock even though temperature limits have not been exceeded. Too much copper can actually dissolve 430 base stock resulting in perforation.

With the cuprous oxide slurry method disclosed herein, each passage in a matrix structure, such as a regenerator core, is coated uniformly from top to bottom. This is particularly important in cases where the core matrix is to be further treated as by aluminum diffusion which makes use of the copper braze. This is described in the above referenced copending applications. Any method of applying copper that does not feature this uniformity has additional disadvantages:

Excess Copper

Distorted, plugged or partially blocked passages.
Sucking together of passage walls.
Attack, embrittlement and perforation of base stock.

Gross shrinkage of matrix resulting in splits and leakage within matrix and at rim and hub.

Little or no Copper

No bonding; splits and leakage.
Poor fillets; easily oxidized and broken in service with resultant stock breakage (fatigue).

As the thickness of the matrix stock becomes thinner, e.g., 0.002" or less, uniform distribution becomes more important.

*Preferred copper brazing paste

Typical Specification — This paste has been used at Chrysler Corporation for over 20 years for brazing torque converters. It is identified there by an in-house specification number MS-2680. No claim is made herein to the paste per se.

A. General

1. A grade of cuprous oxide ($Cu_2O$=90%Cu) brazing compound suitable for joining steel parts when used in conjunction with a reducing atmosphere brazing furnace. Brazing compound is applied to the joint area of the parts being joined. The cuprous oxide is reduced to metallic copper by the reaction of the reducing atmosphere at elevated temperatures. The metallic copper melts and forms the brazed joints between the parts being processed.

2. Suitable precautions must be taken in the preparation of this material or corrosion products formed by contact of the ingredients with mixing or packaging equipment or containers. Presence of material containing alkali or alkaline earth metals is harmful to the brazing furnace lining and must be avoided. Presence of iron compounds in concentration sufficient to affect viscosity stability during storage must be avoided. Phosphorus as copper phosphide must be avoided to prevent weak joint strength.

B. Requirements

1. Cuprous Oxide Specification

| | |
|---|---|
| Cuprous Oxide ($Cu_2O$) | Min. 95.0% |
| Cuprous Oxide plus Metallic Copper | Min. 97.0% |
| Total Copper | Min. 86.0% |
| Metals other than Copper | Max. .2% |
| Sulfates | Max. .05% |
| Chlorides | Max. .02% |
| Silica | Max. .08% |

2. Cuprous Oxide Particle Size

The effective particle size and particle size distribution of the cuprous oxide effects the brazing compound viscosity characteristics, settling rate during storage, and fluidity of the applied brazing compound. The desired particle size range varies from about 1-30 microns in diameter with most of the particles being in the 4-20 micron range.

3. Chemical Composition — Brazing Paste
  Formulation of a typical batch.
  Cuprous Oxide (95% Grade) — 1475.0 to 1500.0 lbs.
  Methocel (Dow Chemical Company) (65 H.G. 400 or 4000 cps Grade) — 7.0 to 9.0 lbs.
  Note: Use 400 cps grade Methocel with Pfizer cuprous oxide. Use 4000 cps grade Methocel with Greenback or Glidden cuprous oxide.
  Pluronics L-64 (Wyandotte Chemical Company) — 3.75 to 4.0 lbs.
  Carboway 6000 (Carbide and Carbon Chemical Co.) — 14.5 to 15.0 lbs.
  Glycol (Ethylene or Mixed Ethylene and Propylene) — 11.0 to 11.5 lbs.
  Water to make — 100 gallons.
4. Physical Properties
  Viscosity and density should be measured at 78 ± 1° F. approximately one hour after mixing. The viscosity should be measured with a Brookfield viscosimeter using a No. 6 spindle running at 20 rpm.
  a. Viscosity
    Using 400 cps Methocel — 3000 to 7000 centipoise
    Using 4000 cps Methocel — 8000 to 12,000 centipoise
  b. Density — Min. 20.0 lbs/gal.

What is claimed is:

1. A method of uniformly applying copper brazing material to matrix assemblies for the subsequent copper brazing thereof, comprising the steps:
  A. preparing a slurry of copper brazing paste to form a brazing material,
  B. placing the slurry on one face of the matrix assembly so as to introduce it to the passageways thereof, and
  C. establishing a pressure differential between the faces of the matrix assembly whereby the slurry is caused to flow through the passageways and coat the interior thereof.

2. The method of claim 1 including the additional step of drying the assembly.

3. The method of claim 2 including the additional steps of heating and cooling the assembly to cause the brazing thereof.

4. The method of claim 1 wherein the brazing paste contains $Cu_2O$ particles.

5. The method of claim 1 wherein the brazing paste contains metallic copper particles.

6. The method of claim 1 wherein the slurry vehicle for the brazing paste is water.

7. The method of claim 5 wherein the viscosity (No. 4 Ford cup) of the slurry is adjusted to between about 55 to 60 seconds.

8. The method of claim 1 wherein a positive pressure is established and maintained above the slurry through the passageways thereof.

9. The method of claim 8 wherein the pressure is established by enclosing the face and providing air pump means to pump air into the enclosure thus establishing the positive pressure.

10. The method according to claim 9 wherein air is blown through the passageways following the passage of the slurry therethrough, maintaining the passage of air until the slurry coating is substantially dry.

11. The method according to claim 9 including the additional step of removing any slurry drip edge formed on the second face of the matrix.

12. The method according to claim 1 wherein slurry is applied until the matrix shows a dry weight increase of at least about 8 percent but less than about 10 percent over its original weight.

13. The method of claim 1 wherein the slurry is formed by diluting a copper brazing paste.

14. The method of claim 13 wherein the diluent is water.

* * * * *